Patented June 30, 1931

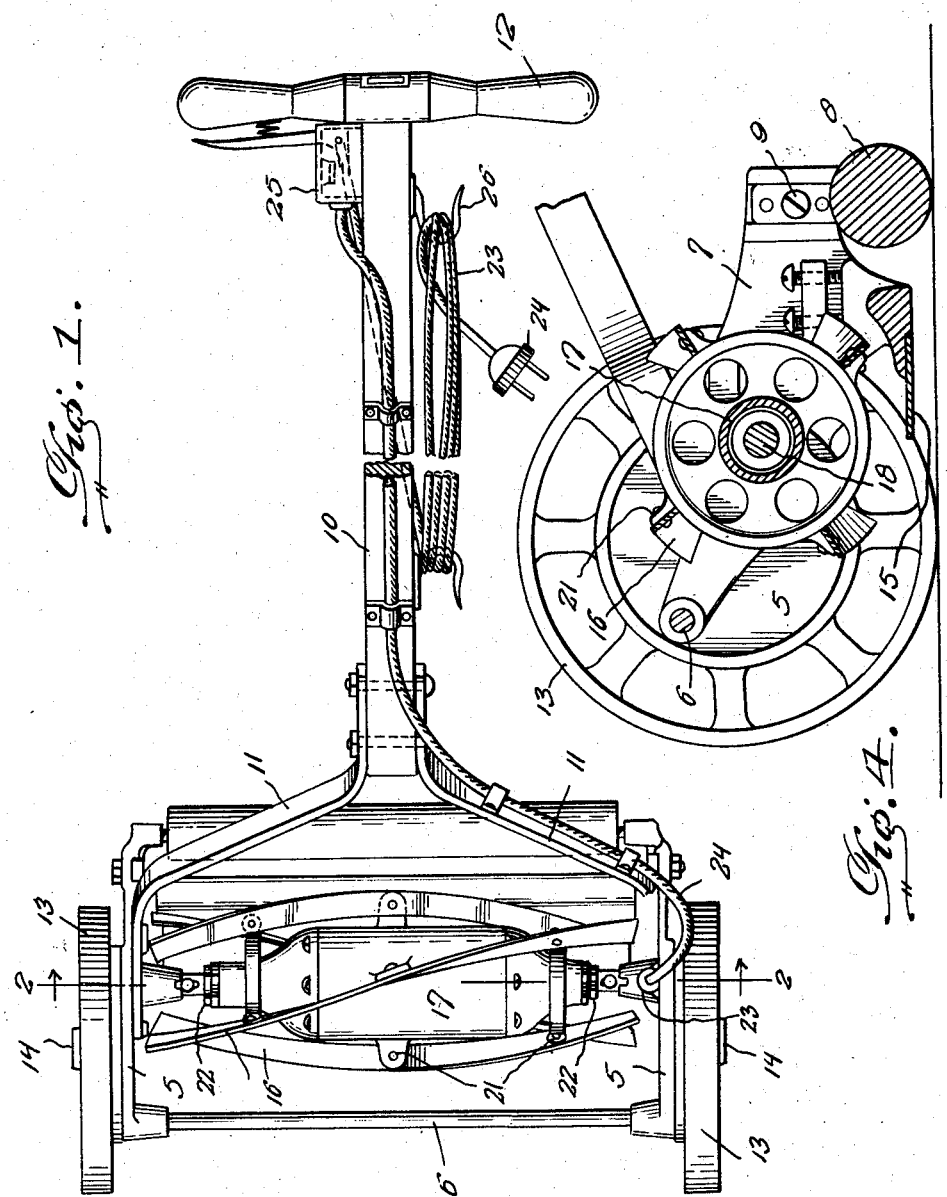

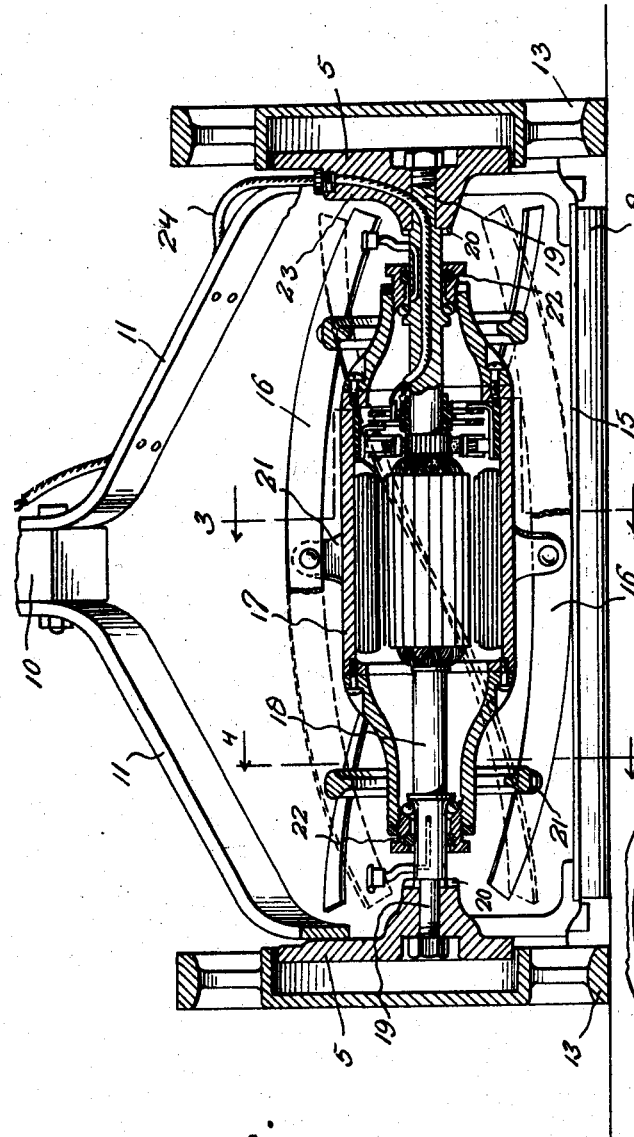
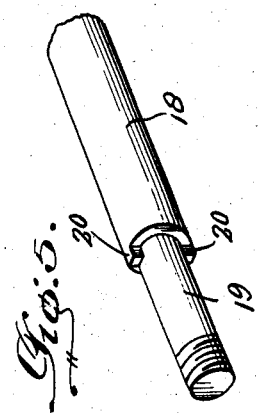
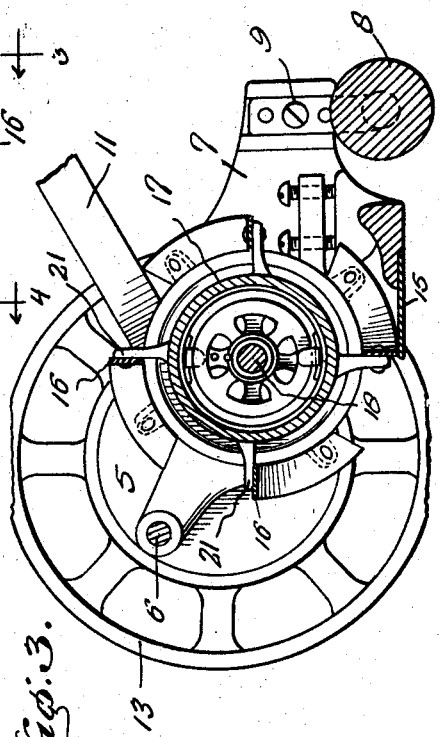

1,812,272

UNITED STATES PATENT OFFICE

CHARLES R. STEINMETZ, OF OKLAHOMA CITY, AND HAROLD F. McKINNEY, OF OKMULGEE, OKLAHOMA

LAWN MOWER

Application filed November 20, 1928. Serial No. 320,639½.

This invention relates to lawn mowers, and has more particular reference to mowers of that type wherein the cutting reel or cylinder is driven by a motor instead of being operated by the ground wheels.

The primary object of the present invention is to provide a mower which is simple and compact in construction, inexpensive to manufacture, and extremely efficient in operation.

A further object is to provide an improved mower wherein the motor has a rotating casing forming part of the cutting reel and directly carrying the blades of the latter to avoid objectionable gearing between the reel and the motor.

The present invention consists in the novel form, combination and arrangement of parts hereinafter more fully described, shown in the accompanying drawings and claimed.

In the drawings:

Figure 1 is a plan view, partly broken away, of a mower embodying the present invention.

Figure 2 is a enlarged fragmentary transverse section taken substantially on line 2—2 of Figure 1.

Figure 3 is a longitudinal section on line 3—3 of Figure 2.

Figure 4 is a section on line 4—4 of Figure 2; and

Figure 5 is a fragmentary perspective view, showing an end portion of the motor shaft.

Referring more in detail to the drawings, the present mower includes a suitable frame embodying a pair of side plates 5 rigidly connected by a transverse rod 6 and having rearward extensions 7 between which the usual gauge roller 8 is suitably mounted for vertical adjustment, as at 9. A handle 10 is also provided, having divergent arms 11 at its lower end whose free ends are connected to the side frame plates 5, and provided at its upper rear end with a cross bar 12 whose ends are shaped to form hand grips. By this means the mower may be conveniently manually pushed and guided. Coaxial ground wheels 13 are suitably journaled on the outer sides of the frame plates 5, as at 14, and supported by the extensions 7 is an adjustable ground knife 15 adapted to cooperate with the spiral blades 16 of the cutting reel in a well known manner.

In the form of the invention shown, an electric motor is mounted between the frame plates 5, and this motor has a rotating field carried by a casing 17, and a stationary armature carried by an armature shaft 18 whose ends are reduced as at 19 and secured in openings formed in the frame plates 5. The motor shaft is also keyed as at 20 to the plates 5 for being positively held against turning, and the blades 16 of the reel are preferably secured to lugs 21 rigid with the motor casing 17. As shown, the blades 16 are arranged about the motor so that the motor is substantially housed within the blades and, in conjunction with the latter, forms a cutting reel extending the full width of the frame for giving a cut of corresponding width. In view of the above, the motor is rigidly supported against vibration within the frame, and objectionable gearing between the reel and motor is avoided. Adjustable anti-friction bearings 22 are provided between the ends of the motor casing and the shaft 18 so as to take up wear and prevent play between the casing and the shaft, so that constant contact of the blades 16 with the ground knife 15 is insured.

Current may be supplied to the motor by the use of an attachment cord 23 having an attachment plug 24 at one end for connection with a suitable source of current supply, the operation of the motor being effected by manipulation of the handle of a suitable normally open switch 25, which handle is actuated by the hand gripping an end of the cross bar 12. Hooks 26 may be provided on the mower handle 10 about which the cord 23 may be wound when not in use.

In the form of the invention shown, one of the frame plates 5 is of special form, and this plate has an inwardly projecting part 23 provided with a bore or passage through which is extended the feed cable 24 of the motor. The adjacent end of the shaft 18 has a passage as shown in Figure 2 through which the cable 24 is passed from the passage of the part 23 into the motor casing 17.

A mower constructed as described will be well balanced, will stand hard usage, and will eliminate loss of adjustment and vibration to an extent sufficient to insure satisfactory operation.

Minor changes may be made without departing from the spirit and scope of the invention as claimed.

What we claim as new is:

A lawn mower comprising a frame, ground engaging wheels carried by the frame, a stationary shaft, an electric armature carried by said shaft, an electric field casing surrounding the armature and cutter blades carried by the field casing, side plates journaled in the wheels, reduced end portions on the shaft for detachably connecting with the side plates, threads on the ends of the shaft for receiving clamping nuts adapted to maintain the shaft and side plates in rigid relationship to each other.

In testimony whereof we affix our signatures.

CHARLES R. STEINMETZ.
HAROLD F. McKINNEY.